United States Patent
Town et al.

(10) Patent No.: US 11,203,238 B2
(45) Date of Patent: Dec. 21, 2021

(54) LOCKABLE RECOVERY DEVICE FOR VEHICLE

(71) Applicant: STRATTEC SECURITY CORPORATION, Milwaukee, WI (US)

(72) Inventors: Scott M. Town, Milwaukee, WI (US); Kyle R. Boyea, Sussex, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 153 days.

(21) Appl. No.: 16/584,024

(22) Filed: Sep. 26, 2019

(65) Prior Publication Data
US 2020/0130438 A1  Apr. 30, 2020

Related U.S. Application Data

(60) Provisional application No. 62/752,412, filed on Oct. 30, 2018.

(51) Int. Cl.
*B60D 1/02* (2006.01)
*B60D 1/04* (2006.01)

(52) U.S. Cl.
CPC ............... *B60D 1/025* (2013.01); *B60D 1/04* (2013.01)

(58) Field of Classification Search
CPC . B60D 1/025; B60D 1/04; B60D 1/02; B60D 1/28; B60D 1/58; B60D 1/60
See application file for complete search history.

(56) References Cited

U.S. PATENT DOCUMENTS

| | | | | |
|---|---|---|---|---|
| 3,501,817 A | * | 3/1970 | Bambenek | B66C 1/36 294/82.19 |
| 3,863,441 A | * | 2/1975 | Kaufmann | F16G 17/00 59/93 |
| 4,576,021 A | * | 3/1986 | Holden | E05B 67/36 411/351 |
| 5,046,881 A | * | 9/1991 | Swager | F16D 25/082 403/154 |
| 5,682,775 A | * | 11/1997 | Baber | E05B 65/0864 70/34 |
| 6,023,927 A | * | 2/2000 | Epstein | F16G 15/06 59/85 |
| D431,180 S | * | 9/2000 | Gray, Jr. | D8/367 |

(Continued)

OTHER PUBLICATIONS

Stainless Steel Locking Pin for Hitch, https://www.bulletproofhitches.com/product/stainless-steel-locking-pin-class-4-5/?gclid=EAIaIQobChMI58eF040T3gIVz7rACh2kjALqEAQYBCABEgJDBvD_BwE, accessed Oct. 19, 2018.

(Continued)

*Primary Examiner* — Tony H Winner
*Assistant Examiner* — Michael R Stabley
(74) *Attorney, Agent, or Firm* — Michael Best & Friedrich LLP

(57) ABSTRACT

A lockable tow device for a vehicle includes a main portion defining a hook or shackle and a connector portion extending from the main portion and forming a receptacle. A pin is received in the receptacle, the pin forming a wrist joint of the tow device. An integral lock has a locked position that prevents removal of the pin and an unlocked position that enables removal of the pin, and can be spaced from the pin.

19 Claims, 8 Drawing Sheets

(56) References Cited

U.S. PATENT DOCUMENTS

| | | | | |
|---|---|---|---|---|
| 7,448,823 | B2* | 11/2008 | Silva | F16G 15/06 403/325 |
| 8,104,988 | B2* | 1/2012 | Lunn | F16G 15/06 403/154 |
| 8,381,363 | B2* | 2/2013 | Boeckman | F16B 45/00 24/132 WL |
| 9,086,118 | B2* | 7/2015 | Campbell | F16G 15/06 |
| 10,143,866 | B2* | 12/2018 | Yang | A63B 29/02 |
| 10,202,260 | B2* | 2/2019 | Costa | F16G 15/06 |
| 10,822,204 | B2* | 11/2020 | Maassen | B66C 1/34 |
| 2001/0023601 | A1* | 9/2001 | Gilbertson | B60D 1/60 70/258 |
| 2005/0225054 | A1* | 10/2005 | Budge | B60D 1/06 280/507 |

OTHER PUBLICATIONS

7/8"×2" Tapered Locking Pin Wicked Rails (61015), https://infiniterule.com/collections/locking-pin/products/61015, accessed Oct. 19, 2018.

* cited by examiner

LOCKABLE RECOVERY DEVICE FOR VEHICLE

CROSS-REFERENCE TO RELATED APPLICATIONS

This application claims priority to U.S. Provisional Patent Application No. 62/752,412, filed Oct. 30, 2018, the entire contents of which are incorporated by reference herein.

BACKGROUND

The present disclosure relates to vehicle recovery devices, for example recovery hooks or shackles that are commonly used in off-road and other vehicles. Such devices may be mounted to pivot or swivel on a vehicle mount. The mounting is typically provided by a removable pin.

SUMMARY

In one aspect of the invention, a lockable tow device for a vehicle includes a main portion defining a hook or shackle and a connector portion extending from the main portion and forming a receptacle. A pin is received in the receptacle, the pin forming a wrist joint of the tow device. An integral lock has a locked position that prevents removal of the pin and an unlocked position that enables removal of the pin. The integral lock is spaced from the pin.

In another aspect of the invention, a lockable tow device for a vehicle includes a monolithic body defining at one end a hook or shackle and at another end a connector portion forming a first receptacle. A pin is received in the first receptacle, the pin forming a wrist joint of the tow device. A lock has a locked position that prevents removal of the pin and an unlocked position that enables removal of the pin. The lock is received in a second receptacle of the body separate from the first receptacle.

Other aspects of the invention will become apparent by consideration of the detailed description and accompanying drawings.

DETAILED DESCRIPTION

Before embodiments of the present invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
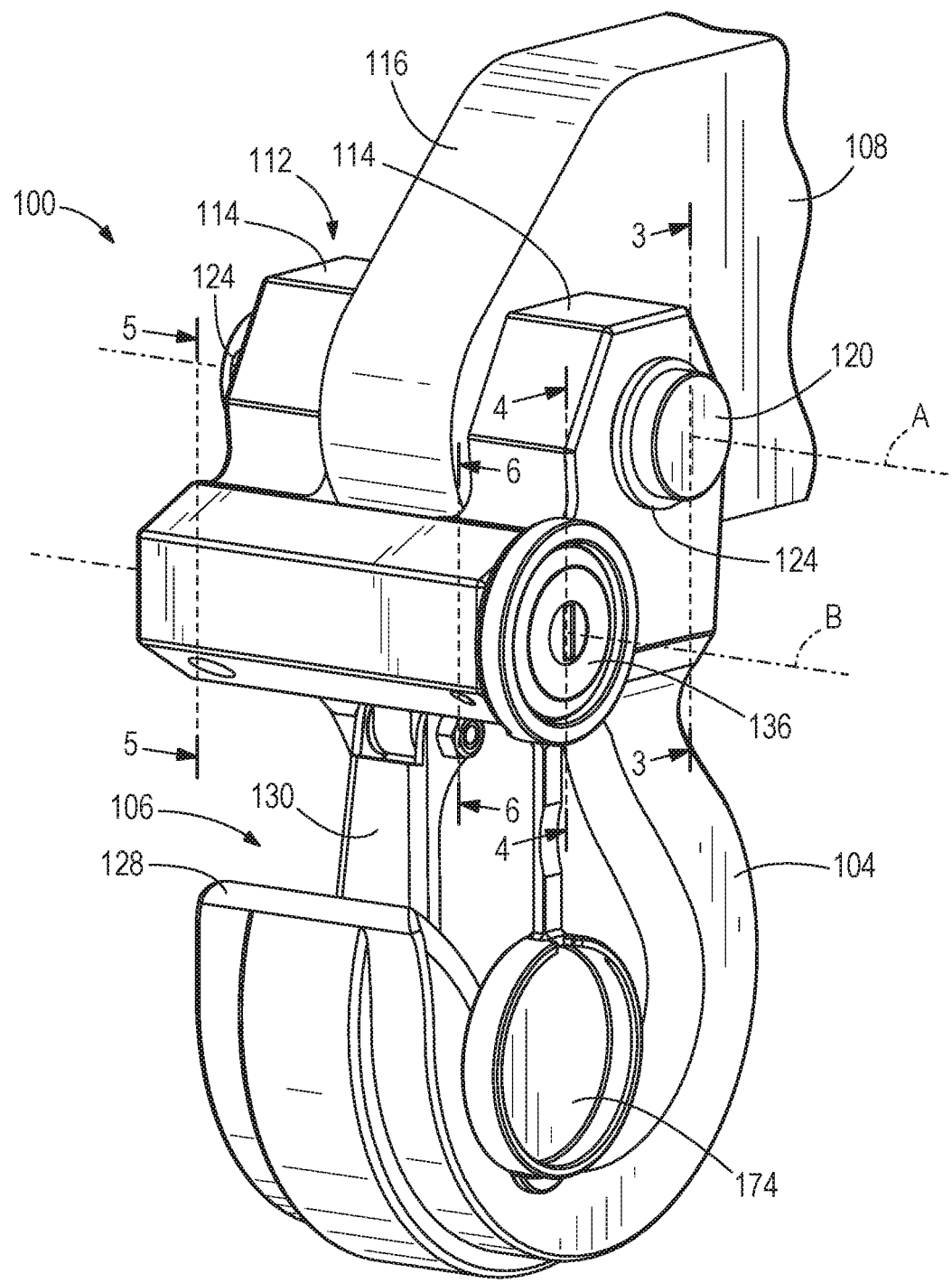
FIG. 1 is a perspective view of a lockable recovery hook according to one embodiment.

Referring to FIG. 1, a lockable recovery device 100 for a vehicle is illustrated. The device 100 includes a main portion 104 in the form of a hook or shackle, for example, defining a receptacle area 106 for receiving a tow apparatus such as a strap, chain, rope, cable, etc. As known in the off-road vehicle field, such a device can be coupled to another vehicle, a fixed or vehicle-mounted winch, etc. in order to recover a vehicle that has become stuck during a serious off-roading excursion. However, the device may be used for other purposes in addition to vehicle towing or recovery. When provided in the form of a hook, the main portion 104 includes a hook end or tip 128 defining an entry and exit into and out of the receptacle area 106 defined by the main portion 104. Furthermore, a spring-biased catch finger 130 can be provided (e.g., pivotally coupled to an interior side of the main portion 104) in order to selectively enable admittance of a tow apparatus into and removal of the tow apparatus from the receptacle area 106.

Figure 2:
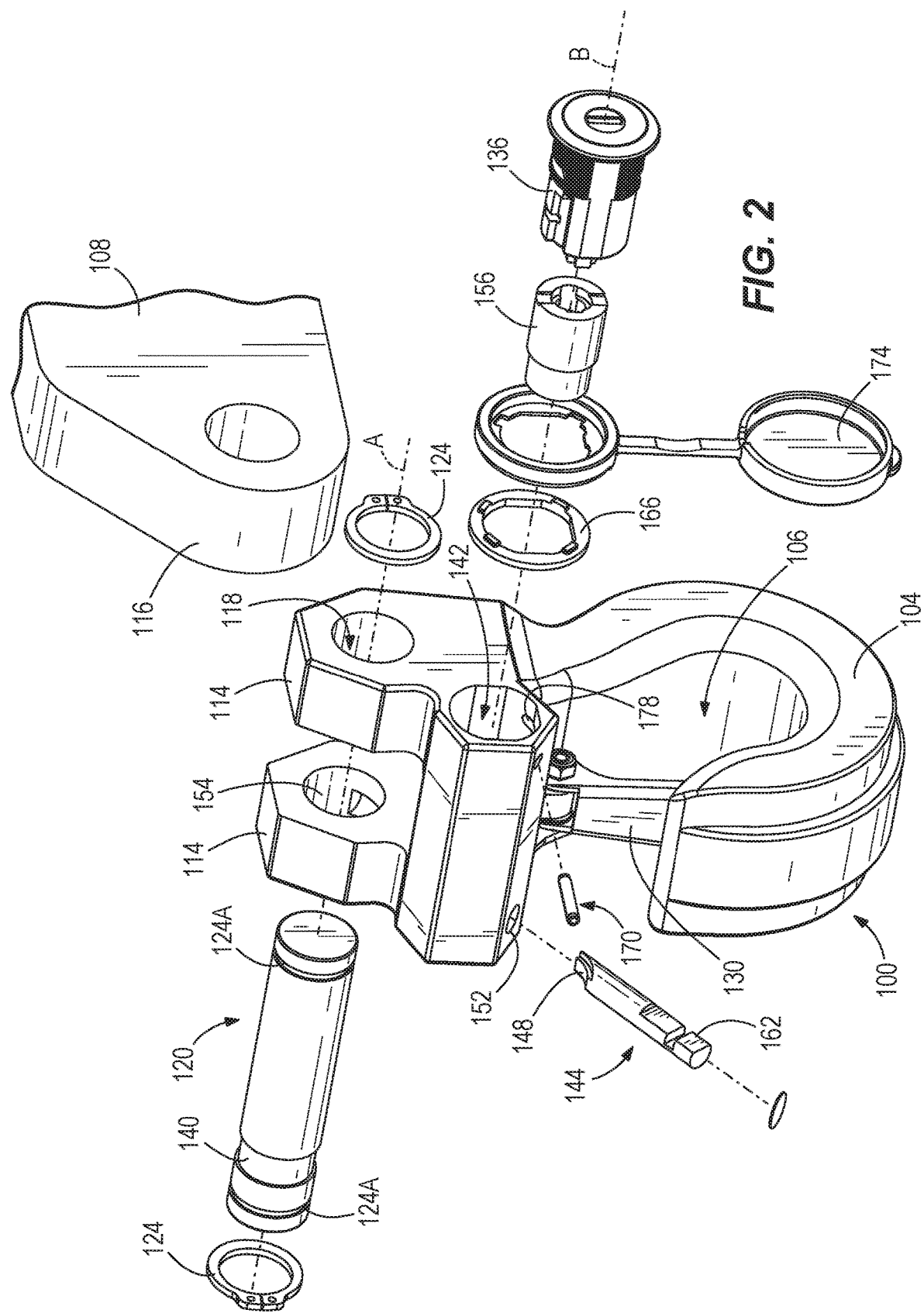
FIG. 2 is an exploded assembly view of the recovery hook of FIG. 1.
Figure 3:
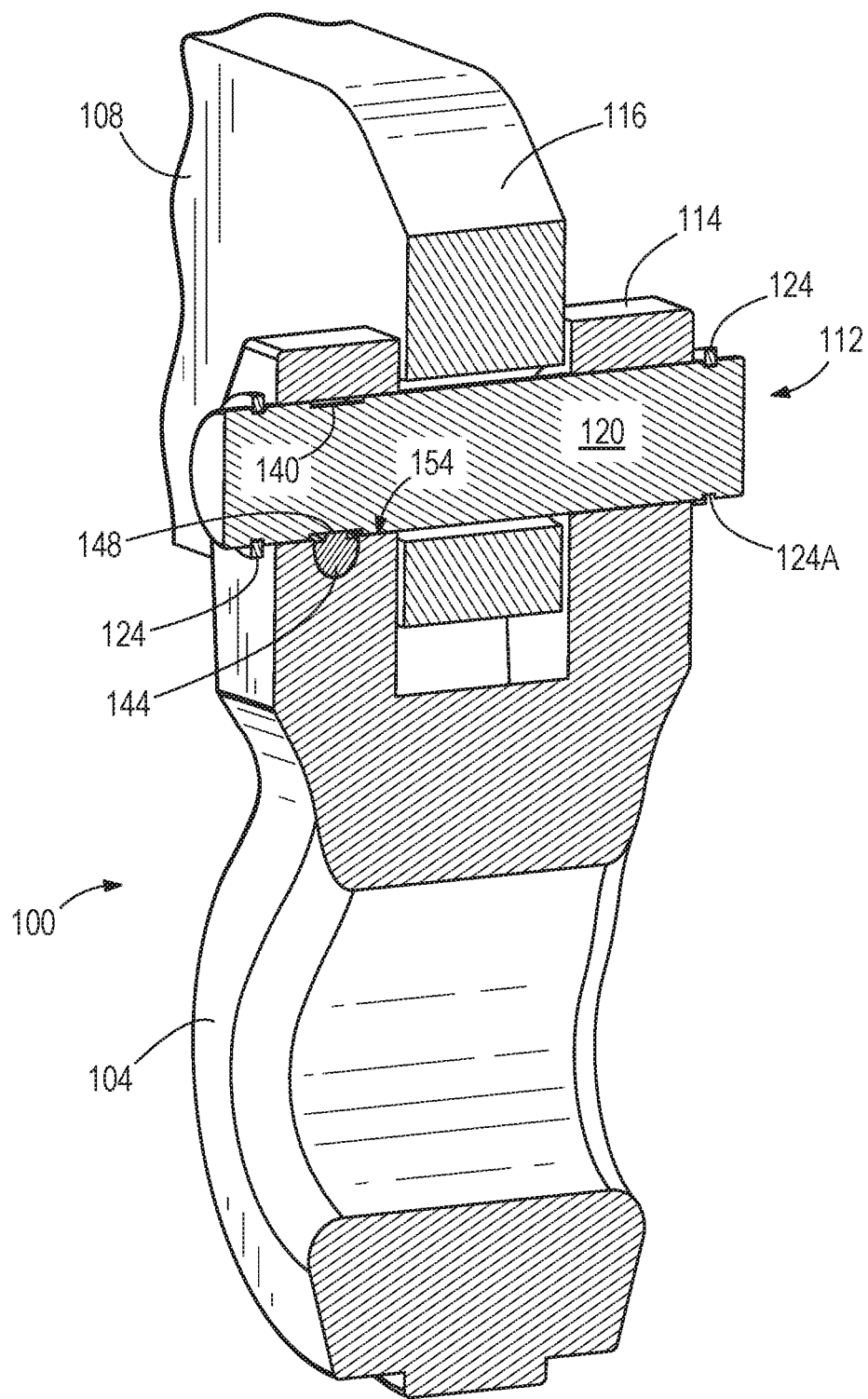
FIG. 3 is a cross-section view of the recovery hook, taken along line 3-3 of FIG. 1.
Figure 4:
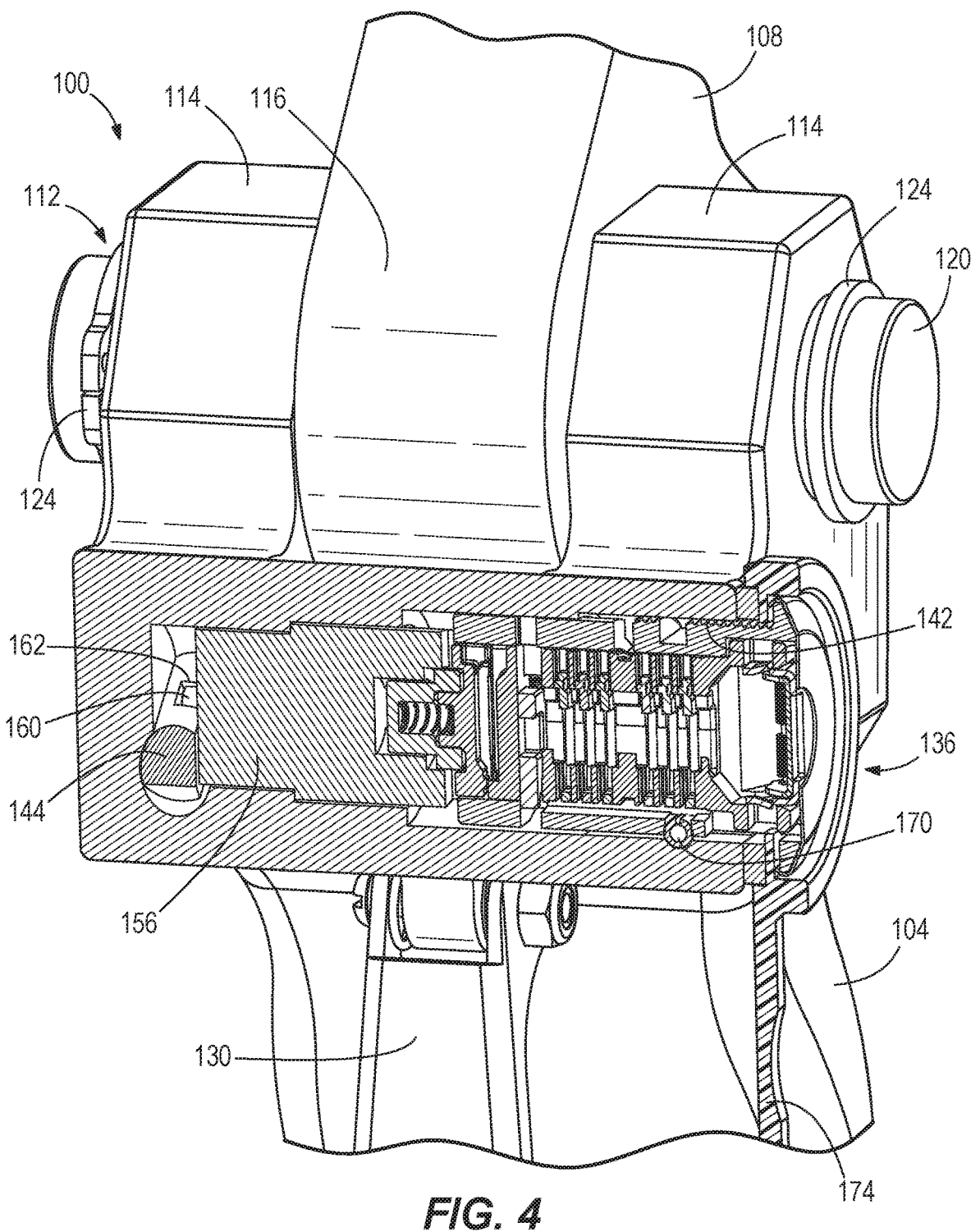
FIG. 4 is a cross-section view of the recovery hook, taken along line 4-4 of FIG. 1

The recovery device 100 is rotatably mounted to a vehicle mount 108. The vehicle mount 108 can be a portion of the vehicle frame, for example, or an adapter fixedly secured to the vehicle frame. The recovery device 100, referred to hereinafter as the hook 100, is coupled to the mount 108 to define a pin joint or wrist joint 112. As illustrated, the wrist joint 112 provides a single rotational degree of freedom about an axis A. Two spaced connector portions 114 of the hook 100 form a clevis that receives a protruding portion 116 of the mount 108 therebetween. The connector portions 114 are distinguished from the main portion 104, though they may be integrally, monolithically formed as a single piece or body (e.g., metal casting or forging) in some constructions, as illustrated. A pin 120 extends through aligned apertures in the connector and protruding portions 114, 116 along the axis A to couple the hook 100 and the mount 108. In other constructions, the hook 100 may include a single connector portion (e.g., the vehicle mount 108 may provide a clevis). The apertures define a pin-receiving receptacle 118 in the hook 100 (FIG. 2). The pin 120 can be held in place along the axis A by a retaining clip 124 at each end. As mounted on the mount 108, the axis A can be oriented as a horizontally-extending axis so that the hook 100 can pivot up and down about the pin 120. For example, the hook 100 can hang down by gravity to assume a first or at-rest position as shown in the drawings. When needed for vehicle recovery, the hook 100 can be pivoted upwardly to extend out horizontally from the mount 108. Depending upon the positions and orientations of the vehicle(s) involved and the terrain, the hook 100 can swing further upward or downward from horizontal during use.

The retaining clips 124 are seated in circumferential grooves 124A of the pin 120 as shown in FIG. 2, and are sufficient to prevent inadvertent axial displacement of the pin 120, but do not provide any security against theft as they are easily removable by hand or with the assistance of a basic hand tool, allowing detachment of the hook 100 from the vehicle. In order to provide increased security against the unauthorized removal of the hook 100 from the mount 108, the hook 100 includes an integrated or "built-in" lock 136, for example a key-operated lock. Integral or integrated in this sense refers to the fact that the lock 136 is not put onto and taken off of the hook 100 in order to lock and unlock the hook 100. Further, the lock 136 resides at least partially internal to the hook 100 (e.g., is at least partially or fully encircled by or otherwise located within the body of the hook 100, and/or is housed within the body of the hook 100)

and is permanently or semi-permanently installed so that removal from the hook 100 is particularly laborious and may require highly specialized tools and/or destruction of the hook 100 so that it serves as a theft deterrent. The lock 136 is adapted to receive a key (not shown). A key slot of the lock 136 may be configured to receive the key in a direction parallel to the pin axis A. In particular, the lock 136 defines a lock axis B that is parallel to and offset from the pin axis A. In other constructions, the lock axis B is perpendicular or skewed with respect to the pin axis A. It is also noted that the lock 136 itself is offset or spaced from the pin 120, and is offset or spaced from the pin-receiving receptacle 118. In other words, the lock 136 resides outside the outer profile of the pin 120 when viewed axially, and may also reside outside the receptacle 118. The lock 136 can be a cylindrical or barrel-shaped lock having therein a plurality of tumblers actuated individually by separate portions of the key to selectively enable rotation from a locked position to an unlocked position when the correct key is used.

As described in further detail below, the lock 136 selectively locks the pin 120 when locked. More particularly, the lock 136 is operable to selectively cause an interference or engagement with a locking recess 140 formed in the pin 120. As such, the lock 136 selectively blocks removal of the pin 120 from the hook 100 to prevent disassembly and removal. The locking recess 140 is illustrated as a circumferential groove, but the locking recess can be a localized notch or groove, an aperture, etc. It is noted that the lock 136, while integrated with the hook 100, is not integrated with the pin 120 in the illustrated embodiment. The lock 136 is received in a receptacle 142 of the hook 100 that is separate from (and spaced from) the pin-receiving receptacle 118. As such, the lock 136 operates in cooperation with an outer profile of the pin 120 to selectively lock the pin 120 against removal from the hook 100. The lock 136 may act directly or indirectly to lock the pin 120 as discussed in further detail below. The lock 136 is positioned further toward the hook tip 128 than the pin 120, and the lock 136 may be provided at a position directly between the pin 120 and the hook tip 128. The receptacle 142 for the lock 136 may position the lock 136 directly above the tow apparatus receptacle 106 formed by the main portion 104 and/or directly above the spring-biased catch finger 130. In this respect, "above" refers to hook 100 in its illustrated at rest position in which the main portion 104 hangs downwardly from the wrist joint 112. Because the lock is not integrated with the pin 120, the pin 120 is solid rather than hollow in cross-section throughout its length, which extends entirely through the connector and protruding portions 114, 116.

Figure 5:
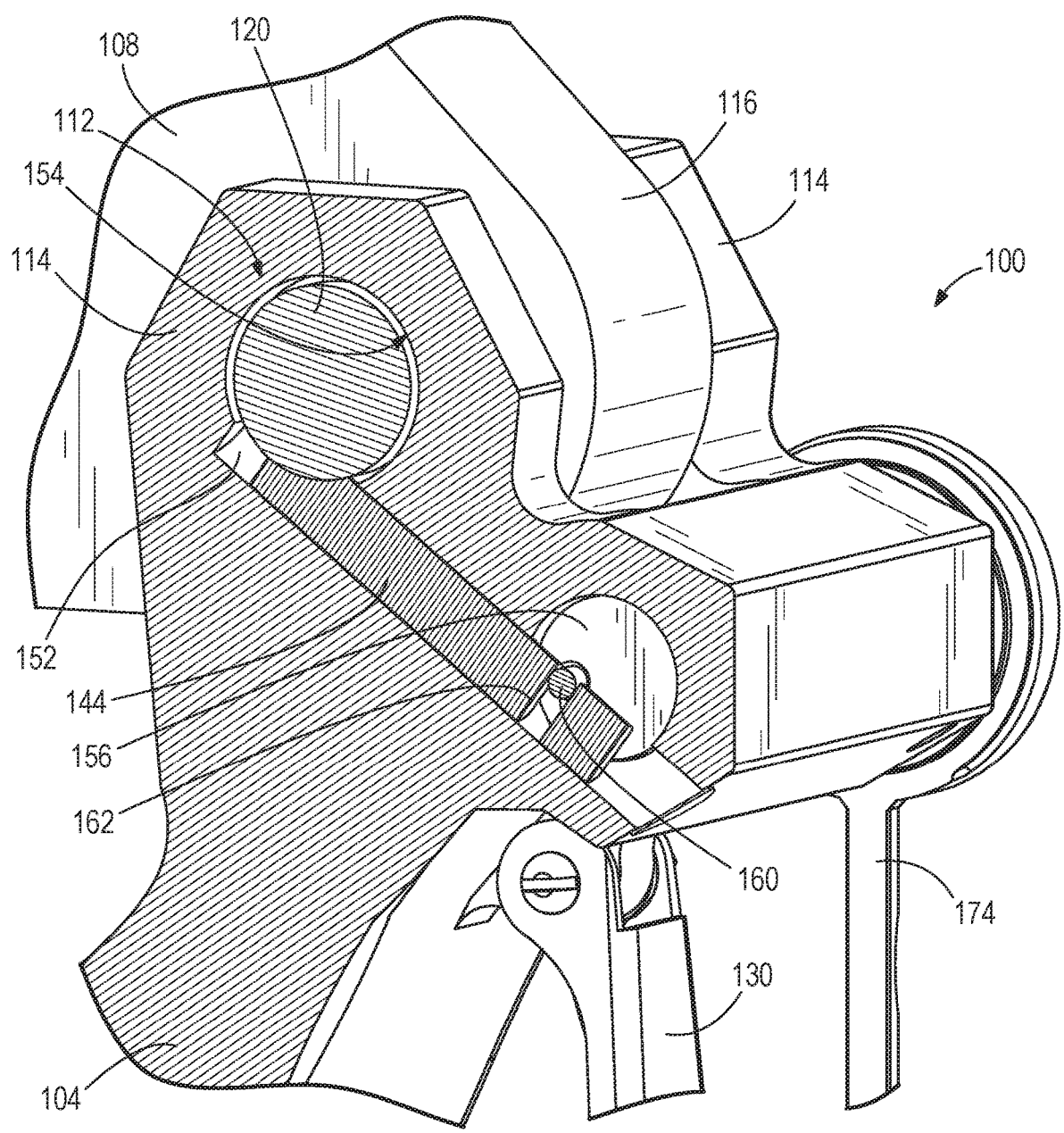
FIG. 5 is a cross-section view of the recovery hook, taken along line 5-5 of FIG. 1.
Figure 6:
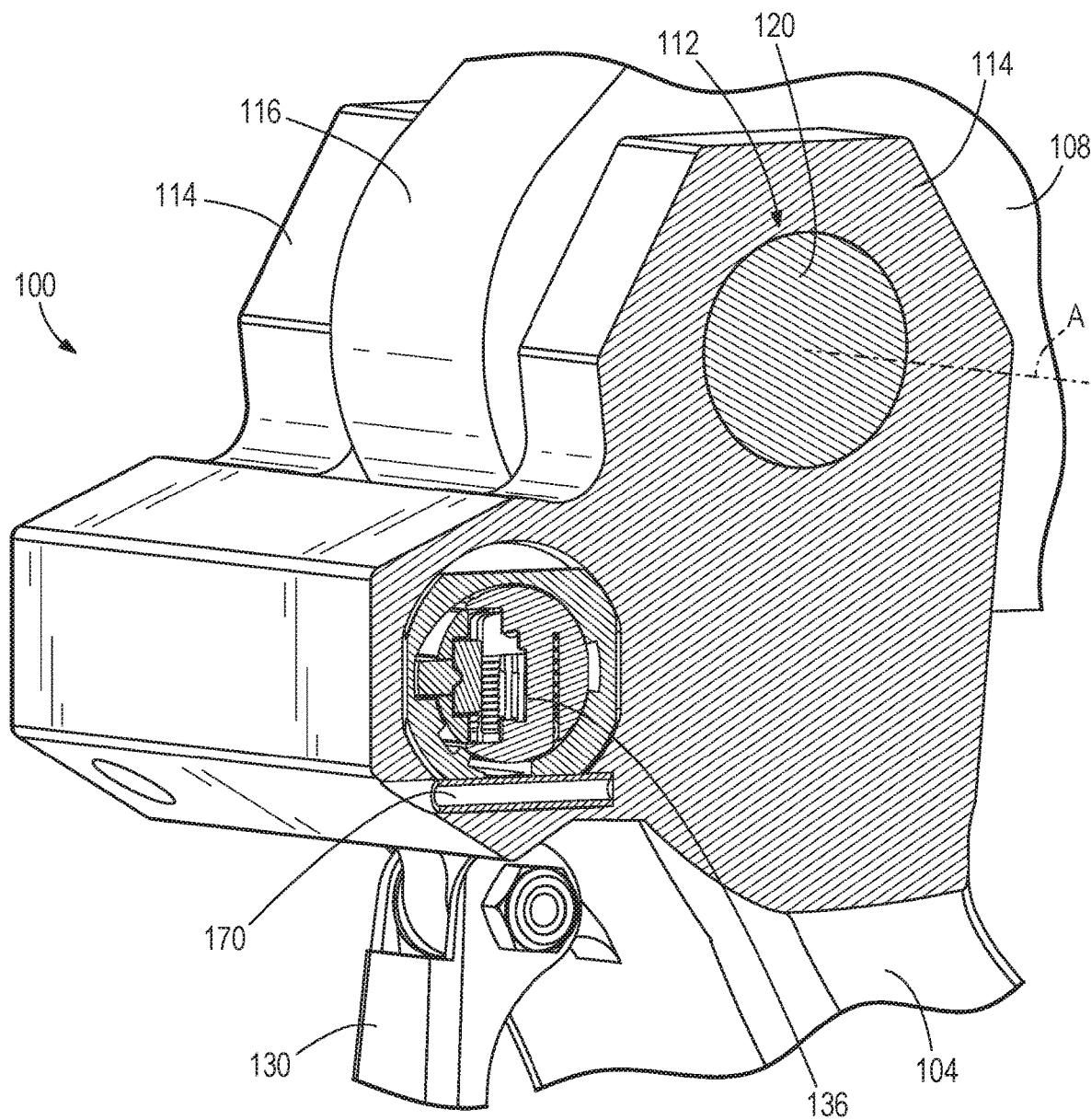
FIG. 6 is a cross-section view of the recovery hook, taken along line 6-6 of FIG. 1.
Figure 7:
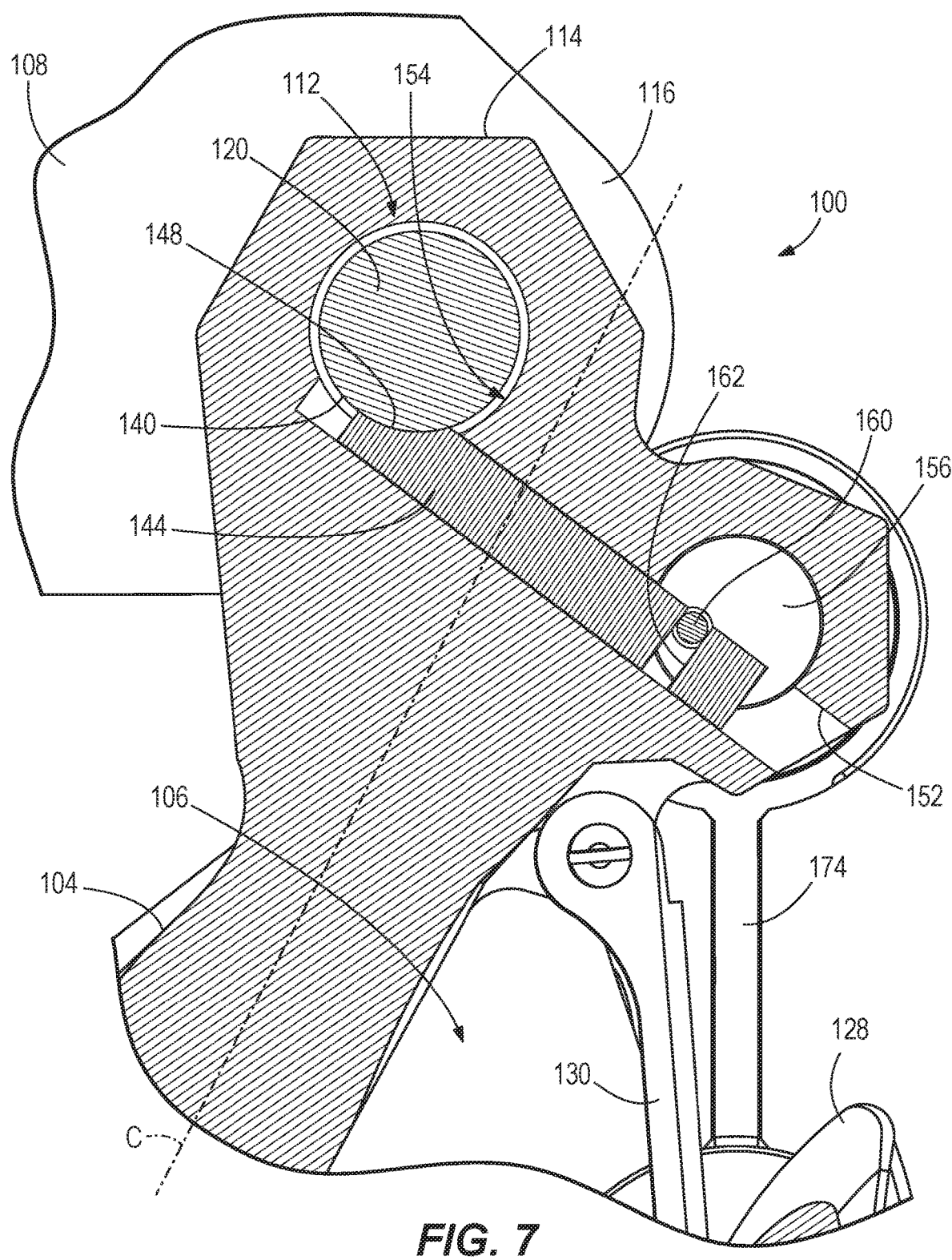
FIG. 7 is a cross-section view of the recovery hook similar to FIG. 5, illustrating the lock in a locked position.
Figure 8:
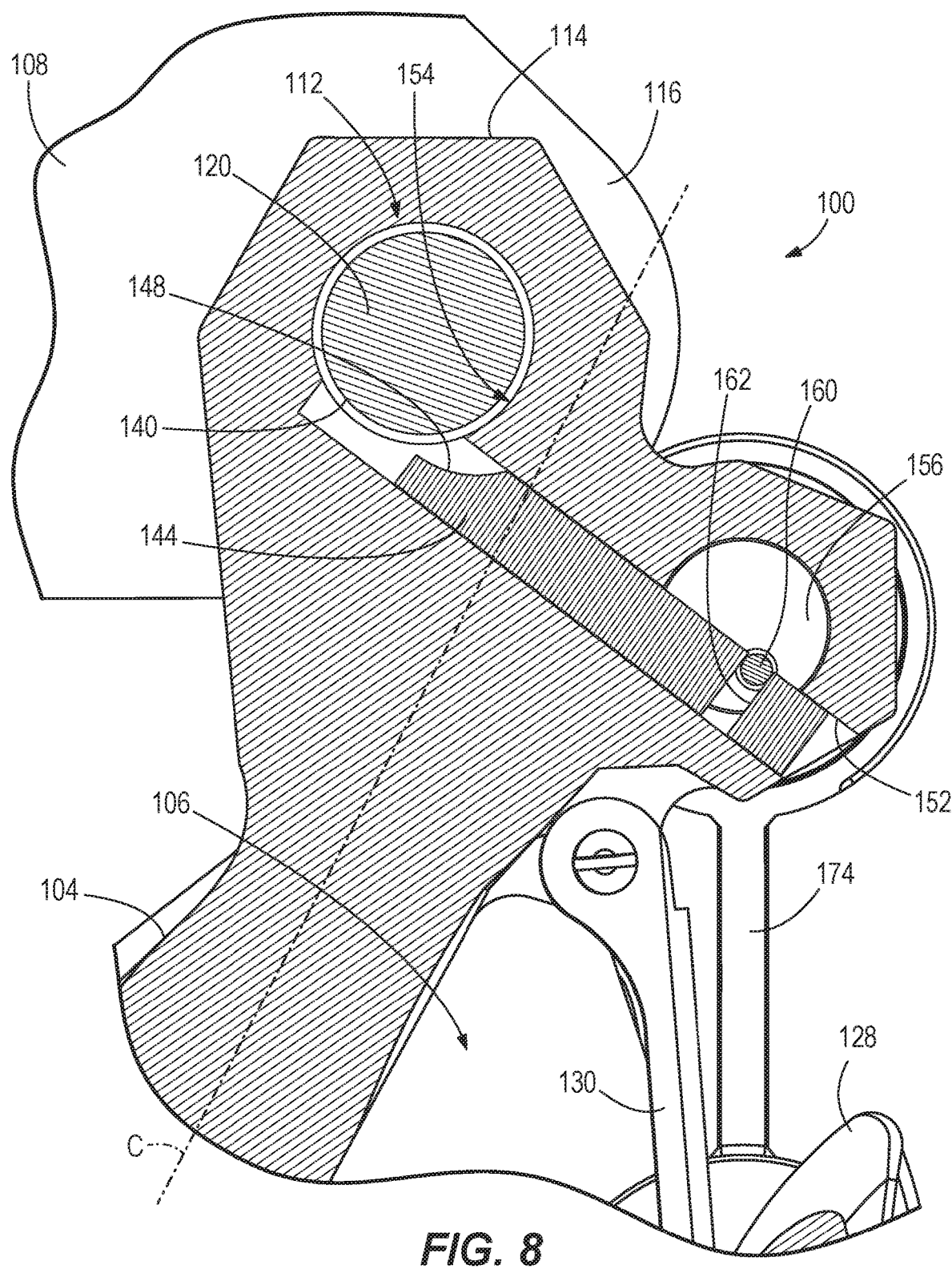
FIG. 8 is a cross-section view of the recovery hook similar to FIG. 5, illustrating the lock in an unlocked position.

The lock 136 is part of a lock assembly that further includes a locking pin 144 that engages the locking recess 140 in the pin 120 (e.g., directly). In particular, the engagement with the locking recess 140 is made by an arcuate rib 148 provided at a distal end of the locking pin 144. The distal end of the locking pin 144 can further include one or more arcuate guide surfaces adjacent the rib 148 that contact an outer circumferential surface of the pin 120 adjacent the locking recess 140. The locking pin 144 can be slidably received in a channel 152 of the hook 100 that connects a portion of the pin-receiving receptacle 118 with a portion of the receptacle 142 for the lock assembly. As shown in at least FIGS. 2, 5, 7 and 8, the channel 152 intersects a wall 154 (e.g., arcuate wall) that defines the pin-receiving receptacle 118. This allows the locking pin 144 to be brought selectively into interference with the outer profile of the pin 120 when viewed along the axis A as shown in FIGS. 5 and 7, and selectively removed to avoid interference with the outer profile of the pin 120 as shown in FIG. 8. In the position of FIG. 8, the pin 120 can be removed by sliding out of the hook 100 once the retaining clip(s) 124 are removed, and this allows removal of the hook 100 from the vehicle, particularly by reversible, non-destructive disassembly of parts. In a locked configuration of the hook 100, the locking pin 144 extends into the pin-receiving receptacle 118, and in an unlocked configuration of the hook 100, the locking pin 144 is retracted from the pin-receiving receptacle 118.

In order for the lock 136 to actuate the locking pin 144, the lock assembly further includes a driver 156 that is coupled to the lock 136 to be moved (e.g., rotated) in response to movement of the lock 136 between locked and unlocked positions. The driver 156 includes a driver pin 160 that protrudes axially from an end of the driver 156 and engages with a channel 162 in the locking pin 144 as shown in FIGS. 4, 5, 7, and 8. In other constructions, the locking pin 144 includes a protruding feature engaged with a channel of the driver 156. The driver 156 and the locking pin 144 thus define a sliding or camming interface whereby the driver 156 (e.g., when rotated by the lock 136) causes a movement (sliding or translating in the channel 152) of the locking pin 144 to engage or release the rib 148 into/from the locking recess 140. In the illustrated embodiment, the lock assembly further includes a washer 166, a roll pin 170 operable to secure the lock 136 in the lock receptacle 142 of the hook 100, and a lock cover 174 to selectively cover and protect the key slot of the lock 136. The roll pin 170 can be driven into an aperture 178 of the hook 100 that intersects with an outer profile of the lock 136 so as to permanently or semi-permanently secure the lock 136 in the hook 100. As shown in FIG. 7, a reference plane C is defined through the hook 100, the reference plane C being defined parallel to the axes A, B and extending centrally through an upper neck of the main portion 104 that mates with the connector portions 114. The pin 120 lies exclusively on an opposite side of the reference plane C from a side on which the lock 136 and the driver 156 are located. In other words, the lock 136 and the pin 120 lie exclusively on opposite sides of the reference plane C. The locking pin 144 intersects the reference plane C so as to act as the intermediary mechanism or link of the lock assembly between the components on opposite sides of the reference plane C, namely the lock 136 and the item to-be-locked (i.e., the pin 120).

Thus, the disclosure provides, among other things, a lockable tow device. The embodiments described above and illustrated in the figures are presented by way of example only, and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims For example, although the embodiments described above and illustrated in the figures are applied to vehicle hook or shackle recovery devices, other applications of the lockable device include tow accessories, supports, and any other accessory suitable for releasably connection to a vehicle, such as to the hitch, tow bar, mount, load point, or other location of a vehicle.

What is claimed is:
1. A lockable tow device for a vehicle, the tow device comprising:
   a main portion defining a hook or shackle;
   a connector portion extending from the main portion and forming a receptacle;

a pin received in the receptacle, the pin forming a wrist joint of the tow device; and an integral lock having a locked position that prevents removal of the pin and an unlocked position that enables removal of the pin, wherein the integral lock is spaced from the pin.

2. The lockable tow device of claim 1, wherein the pin has a solid cross-section.

3. The lockable tow device of claim 1, wherein the pin defines a first axis and the lock defines a second axis parallel to the first axis.

4. The lockable tow device of claim 1, wherein the main portion defines an upper neck part mating with the connector portion, and wherein a central plane bisecting the upper neck part separates the lock and the pin such that the pin lies exclusively on a first side of the central plane and the lock lies exclusively on a second side of the central plane.

5. The lockable tow device of claim 1, wherein the main portion defines a hook having a distal tip, and wherein the lock is positioned between the distal tip of the hook and the pin.

6. The lockable tow device of claim 1, wherein the main portion defines a receptacle area for a towing strap, chain, rope, cable, etc., and the lock is positioned directly above the receptacle area when the lockable tow device hangs freely from the wrist joint.

7. The lockable tow device of claim 1, wherein the lock is part of a lock assembly further having a locking pin slidable perpendicular to a central axis of the lock.

8. The lockable tow device of claim 7, wherein the locking pin includes a rib that engages with a locking recess of the pin when the lock is in the locked position.

9. The lockable tow device of claim 8, wherein the locking recess is an at least partially circumferentially-extending groove, and the rib is an arcuate rib.

10. A lockable tow device for a vehicle, the tow device comprising:
a body defining at one end a hook or shackle and at another end a connector portion forming a first receptacle;
a pin received in the first receptacle, the pin forming a wrist joint of the tow device; and
a theft-deterrent key-operated lock having a locked position that prevents removal of the pin and an unlocked position that enables removal of the pin,
wherein the lock is received in a second receptacle of the body separate from the first receptacle, and
wherein a channel in the body receives a locking pin movable by the lock into and out of engagement with the pin.

11. The lockable tow device of claim 10, wherein the locking pin extends perpendicular to a central axis of the pin and perpendicular to a central axis of the lock.

12. The lockable tow device of claim 10, wherein the locking pin includes a rib that engages with a locking recess of the pin when the lock is in the locked position.

13. The lockable tow device of claim 12, wherein the locking recess is an at least partially circumferentially-extending groove, and the rib is an arcuate rib.

14. The lockable tow device of claim 10, wherein the pin has a solid cross-section.

15. The lockable tow device of claim 10, wherein the body is a monolithic body, and wherein the lock is assembled to the body with a permanent or semi-permanent connection.

16. A lockable tow device for a vehicle, the tow device comprising:
a body defining at one end a hook or shackle and at another end a connector portion forming a first receptacle;
a pin received in the first receptacle, the pin forming a wrist joint of the tow device; and
a theft-deterrent key-operated lock having a locked position that prevents removal of the pin and an unlocked position that enables removal of the pin,
wherein the lock is received in a second receptacle of the body separate from the first receptacle, and
wherein an upper neck portion of the hook or shackle that mates with the connector portion is bisected by a central plane that separates the lock and the pin such that the pin lies exclusively on a first side of the central plane and the lock lies exclusively on a second side of the central plane.

17. A lockable tow device for a vehicle, the tow device comprising:
a body defining at one end a hook or shackle and at another end a connector portion forming a first receptacle;
a pin received in the first receptacle, the pin forming a wrist joint of the tow device; and
a theft-deterrent key-operated lock having a locked position that prevents removal of the pin and an unlocked position that enables removal of the pin,
wherein the lock is received in a second receptacle of the body separate from the first receptacle, and
wherein the body defines a hook having a distal tip, and wherein the lock is positioned between the distal tip of the hook and the pin.

18. A lockable tow device for a vehicle, the tow device comprising:
a body defining at one end a hook or shackle and at another end a connector portion forming a first receptacle;
a pin received in the first receptacle, the pin forming a wrist joint of the tow device; and
a theft-deterrent key-operated lock having a locked position that prevents removal of the pin and an unlocked position that enables removal of the pin,
wherein the lock is received in a second receptacle of the body separate from the first receptacle, and
wherein the body defines a receptacle area for a towing strap, chain, rope, cable, etc., and the lock is positioned directly above the receptacle area when the lockable tow device hangs freely from the wrist joint.

19. A lockable tow device for a vehicle, the tow device comprising:
a body defining at one end a hook or shackle and at another end a connector portion forming a first receptacle;
a pin received in the first receptacle, the pin forming a wrist joint of the tow device; and
a theft-deterrent key-operated lock having a locked position that prevents removal of the pin and an unlocked position that enables removal of the pin,
wherein the lock is received in a second receptacle of the body separate from the first receptacle, and
wherein the pin and the lock define separate, parallel axes.

* * * * *